(12) United States Patent
Balint et al.

(10) Patent No.: US 8,475,726 B2
(45) Date of Patent: Jul. 2, 2013

(54) REACTOR AND APPARATUS FOR PYROLYZING WASTE, ESPECIALLY TYRE

(75) Inventors: András Bence Balint, Veszprém (HU); Péter Varga, Nyíregyháza (HU); László Nagy, Gyoer (HU); Sándor Demeter, Veszprém (HU); Iván Pál Fodor, Györ (HU)

(73) Assignee: Pirolisis Project Kft. (HU)

( * ) Notice: Subject to any disclaimer, the term of this patent is extended or adjusted under 35 U.S.C. 154(b) by 409 days.

(21) Appl. No.: 12/673,448

(22) PCT Filed: Aug. 16, 2007

(86) PCT No.: PCT/HU2007/000074
§ 371 (c)(1),
(2), (4) Date: Feb. 7, 2011

(87) PCT Pub. No.: WO2008/020258
PCT Pub. Date: Feb. 21, 2008

(65) Prior Publication Data
US 2011/0116986 A1    May 19, 2011

(30) Foreign Application Priority Data
Aug. 17, 2006  (HU) .................................. 0600661

(51) Int. Cl.
*B01J 19/00*   (2006.01)
*B01J 8/00*    (2006.01)
*B01J 8/18*    (2006.01)
*B01J 8/08*    (2006.01)
*F27B 15/00*   (2006.01)
*F27B 15/14*   (2006.01)
*F27B 15/16*   (2006.01)
*F28D 21/00*   (2006.01)
*B09B 3/00*    (2006.01)
*F23G 5/00*    (2006.01)
*F16K 31/00*   (2006.01)

(52) U.S. Cl.
USPC ........... 422/198; 422/129; 422/139; 422/146; 422/187; 422/202; 422/203; 422/232; 422/233; 110/235; 110/248; 251/14; 251/349; 251/354

(58) Field of Classification Search
USPC ................. 422/129, 198, 202, 205, 232, 233, 422/139, 146, 187; 110/203, 216, 217, 235, 110/248, 322; 251/12, 14, 15, 20, 58, 349, 251/354
See application file for complete search history.

(56) References Cited

U.S. PATENT DOCUMENTS

| | | | |
|---|---|---|---|
| 3,509,027 A | | 4/1970 | Savage et al. |
| 3,583,440 A | * | 6/1971 | Andersson ............... 137/624.14 |
| 4,544,375 A | * | 10/1985 | Rehmat et al. ............. 48/197 R |
| 4,846,668 A | * | 7/1989 | Beierle et al. .................. 431/173 |
| 5,106,390 A | * | 4/1992 | Beierle et al. ............. 48/197 R |
| 5,423,950 A | * | 6/1995 | Avetisian et al. .................. 201/3 |
| 5,584,970 A | * | 12/1996 | Schmalfeld et al. ............ 201/27 |

FOREIGN PATENT DOCUMENTS

| | | |
|---|---|---|
| DE | 31 31 143 A1 | 2/1983 |
| EP | 1 508 607 A1 | 2/2005 |
| EP | 1785248 A1 * | 5/2007 |
| FR | 872 551 A | 6/1942 |
| WO | WO-98/47984 A1 | 10/1998 |
| WO | WO 2005-102639 A8 * | 11/2005 |

OTHER PUBLICATIONS

Machine translation of FR872551 A, which was published Jun. 12, 1942 and provided in the IDs dated Feb. 12, 2010.*
PCT International Search Report for PCT/HU2007/000074 dated Jan. 16, 2008.

* cited by examiner

*Primary Examiner* — Jill Warden
*Assistant Examiner* — Natasha Young
(74) *Attorney, Agent, or Firm* — Rader, Fishman & Grauer PLLC

(57) ABSTRACT

A reactor (6) for pyrolysing waste, in particular rubber tires, said reactor comprising a pyrolysis space (68), an inlet port

(63) and an outlet port (64) enabling a flow across the pyrolysis space (68) of a heating medium for transferring heat required for the pyrolysis, and a lower discharge port (62) for discharging solid residues of the pyrolysis. The invention is, characterized in that—it comprises a baffle means (65) made of a plate material and enabling a gravitational slipping of the solid residues towards the discharge port (62), which baffle means (65) has openings (66) allowing the flow of the heating medium and is arranged to divide the inner space of the reactor (6) to form an upper pyrolysis space (68) and a lower space and—one of the inlet and outlet ports (63, 64) is in connection with the pyrolysis space (68) and the other one with the lower space. The invention is also an apparatus comprising the above reactor (6).

11 Claims, 8 Drawing Sheets

REACTOR AND APPARATUS FOR PYROLYZING WASTE, ESPECIALLY TYRE

TECHNICAL FIELD

The invention primarily relates to a reactor for pyrolysing rubber tyres or other waste, said reactor comprising a pyrolysis space, an inlet port and an outlet port enabling a flow across the pyrolysis space of a heating medium for transferring heat required for the pyrolysis, and a lower discharge port for discharging solid residues of the pyrolysis. The invention relates furthermore to a pyrolysis apparatus comprising the reactor mentioned above.

BACKGROUND ART

It is a known problem that the disposal of various wastes, for example used rubber tyres, puts a heavy burden on the environment. Therefore, a number of solutions have been worked out for recycling scrap rubber tyres in a way that they can be used for extracting materials worth using further. One of the most suitable methods to do so is pyrolysis, which is carried out on whole or shredded rubber tyres according to the prior art.

By way of example, reactors and apparatuses for pyrolysing of rubber tyres and in the given case other wastes are described in U.S. Pat. No. 3,997,407, U.S. Pat. No. 4,846,082, U.S. Pat. No. 5,060,584, U.S. Pat. No. 5,595,483, U.S. Pat. No. 6,048,374, EP 0 532 901 A1, EP 1 462 505 B1 and WO 2005/047435 A2. These known solutions comprise rotary stirring components and fluidised bed approaches for enabling a smooth pyrolysis. The disadvantage of stirring components is that they substantially increase the building and operating costs of the reactor, and furthermore that they entangle the wire sections in the unshredded and shredded rubber tyres, thereby causing a blockage in the pyrolysis space. A disadvantage of the fluidised bed approach is that a relatively high rate of heating medium flow must be provided, and furthermore that due to intensive agitation, the wire tangle problem arises here, too.

In the known reactors, the material intended to be incinerated or pyrolysed is in a continuous motion, as a result of which substantial temperature differences amounting to eventually several hundred degrees arise in the material. Due to the constant and uncontrolled internal movement, in the case of rubber waste reinforced with steel wire cord, large 'balls' are generated from the wires, and their removal from the system represents a difficult problem. A further disadvantage is the requirement of a very high temperature, which may even be higher than 1000° C., and this necessitates the application of very costly structural materials. A further problem is that the period in which waste scraps stay in the apparatus and the resulting rate of temperature changes are occasional—may even be very short or very long—in the various temperature zones (preheating, pyrolysis, oxidation). Therefore, the chemical composition of the generated gas/steam cannot be controlled.

DESCRIPTION OF THE INVENTION

In creating our invention, it was an object to provide a reactor and an apparatus for pyrolysing waste, especially rubber tyres, which are exempt from the disadvantages of prior art solutions. It was a further object to provide a reactor and an apparatus which have a relatively simple design and high efficiency. It was also an object to provide a reactor and an apparatus which would improve pyrolysis efficiency by simple means in addition to ensuring smooth running without additional measures. It was also an object of the invention to make sure that the moving of solids remaining after pyrolysis in the reactor and apparatus according to the invention is carried out as simply as possible, by a relatively small number of mechanical means.

Therefore, according to a first aspect, the invention is a reactor for pyrolysing waste, in particular rubber tyres, said reactor comprising a pyrolysis space, an inlet port and an outlet port enabling a flow across the pyrolysis space of a heating medium for transferring heat required for the pyrolysis, and a lower discharge port for discharging solid residues of the pyrolysis. The reactor comprises a baffle means made of a plate material and enabling a gravitational slipping of the solid residues towards the discharge port, which baffle means has openings allowing the flow of the heating medium and is arranged to divide the inner space of the reactor to form an upper pyrolysis space and a lower space and
  one of the inlet and outlet ports is in connection with the pyrolysis space and the other one with the lower space.

According to a second aspect, the invention is an apparatus for pyrolysing waste, in particular rubber tyres, said apparatus comprising a reactor, means for driving through the reactor a flow of a heating medium for transferring heat necessary for the pyrolysis, and means for discharging the solid residues of the pyrolysis. The apparatus is characterised by comprising an inventive reactor.

Preferred embodiments of the invention are defined in the dependent claims.

BRIEF DESCRIPTION OF THE DRAWINGS

The invention will hereinafter be described by way of preferred exemplary embodiments with reference to the drawings, where.

MODES FOR CARRYING OUT THE INVENTION

The apparatus and reactor according to the invention primarily serve for the recycling of shredded rubber tyres. However, with minor modifications, the apparatus may also be applied for the pyrolysis of unshredded rubber tyres. It is also possible to use the invention for pyrolysing other wastes, e.g. for recycling of other types of rubber or organic or inorganic wastes. The invention will be described below in connection with the pyrolysis of rubber tyre shreds.

Figure 1:
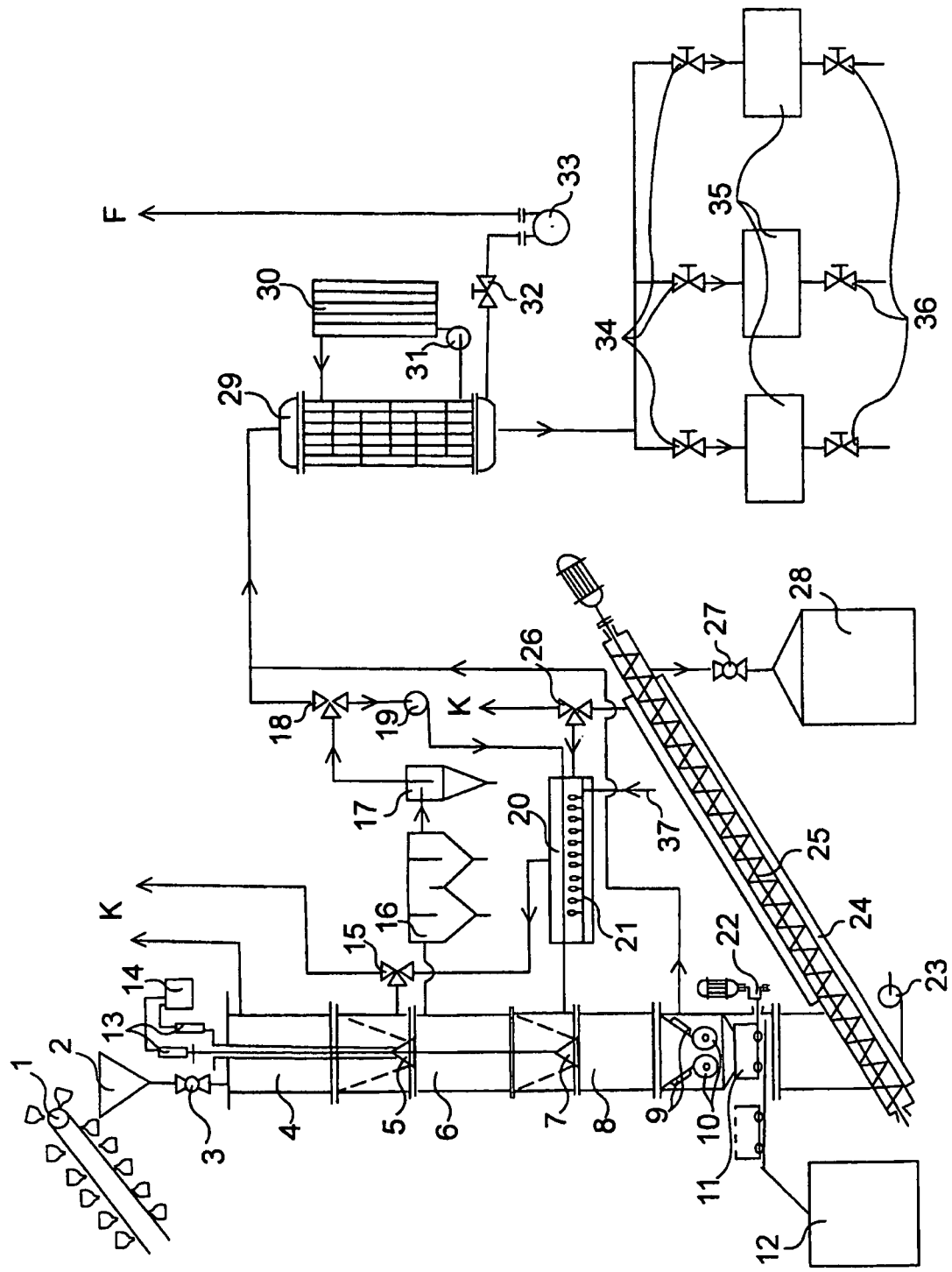
FIG. 1 is a schematic structural view of an apparatus according to the invention.

The wastes to be pyrolysed is fed into the apparatus shown in FIG. 1 by means of a transport apparatus 1 known per se. The waste to be pyrolysed reaches the pre-heater 4—designed to improve the efficiency of waste pyrolysis—through a feeding funnel 2, via a shut-off armature 3 for example a ball valve or butterfly valve. The pre-heated waste reaches the reactor 6 serving as the scene of pyrolysis processes by the actuating of a preferably conical shut-off member 5, and from the reactor 6, the solid residues of pyrolysis are taken to a residue treatment unit 8 by actuating a preferably also conical shut-off member 7. In the lower part of the residue handling unit 8, a cooling baffle means 9 guides the solid residues to cooled crushing cylinders 10. After the completion of the required chemical transformations taking place on the rubber crumbs, by grinding the pyrolysis residues comprising the steel wire cord, elementary carbon and other hydrocarbons, the steel wire cord pieces and the carbon are brought into a status ready for sifting. Grinding is carried out in an enclosed space which is linked to a vacuum system. The grinding makes sure that the carbon black in the pyrolysis residues has a fine grain structure, as a result of which—using trolleys 11 fitted with a waste sieve bottom part—the waste can be segregated into carbon black and steel wires. By means of the trolleys 11, the steel wires are fed into a vessel 12. The shaking of the trolleys 11 is performed by a shaking apparatus 22 known per se.

The shut-off member 5 of the pre-heater 4 and the shut-off member 7 of the reactor 6 are operated by work cylinders 13 supported preferably by a hydraulic or pneumatic power supply 14.

The carbon black falling through the sieve part of the trolleys 11 is fed into a carbon black vessel 28 via a shut-off armature 27, by means of a transporting means 25 which provides cooling. The cooling of the carbon black can be implemented e.g. by passing cooling air injected by a fan 23 in a jacket 24 of the transporting means 25. The cooling air heated up and then leaving the jacket 24 is guided via a three-way regulating armature 26 into a heating chamber of a heat exchanger 20 for example an oil, natural gas, LPG gas or pyrogas boiler, and the chimney K, respectively.

A burner head 21 of the heat exchanger 20 heats up the heating medium introduced into the reactor 6. As a pre-heater medium, the flue gas exiting from the heat exchanger 20 is guided through a three-way regulator armature 15 to the pre-heater 4 and the surplus flue gas is supplied to the chimney K. The pyrogas (pyrogas/heating medium mixture) leaving the reactor 6 through the outlet port 64 is guided into a collision type dust separator chamber 16, and then to a gas cleaner 17 for example to a dust cyclone, where the pyrogas is cleaned.

The cleaned pyrogas/heating medium is returned to the heat exchanger 20 by a heat resistant fan 19 via a three-way regulator armature (distributor valve) 18, and a part of this medium is condensed by a condenser 29. The circulating fan 19 is only required for inputting the energy necessary for the circulation losses of the heat transfer system, and it ensures the flow of the heat transferring pyrolysis gas.

The condenser 29 may have e.g. a tube-bundle or a different design. For the condensation, the cooling medium—for example water—is circulated by a pump 31 between a heat exchanger 30 designed to recool the cooling medium and the condenser 29. By way of example, a water ring vacuum pump 33 makes sure about providing the vacuum through a regulator armature 32 which controls the vacuum level. The pyrogas extracted by the vacuum pump 33 is guided to a torch F, but in the given case it may also be used for heating the heat exchanger 20.

The pyrocondensate leaving the condenser 29 is fed into tanks 35 through shut-off armatures 34, and from the said tanks 35, the condensate can be drained through shut-off armatures 36. The tanks or collecting vessels 35 enable a segregated collection and storage of the condensate of hydrocarbon vapours generated at various temperatures.

According to the invention, the complete grinding, segregating and cooling system is kept under a low (10 to 30 mbar) vacuum, which serves for the extracting and condensation of the gases released from the carbon black. The application of vacuum is also beneficial, because no pyrogas escapes to the environment through eventual leakage points.

The heating medium is replenished as necessary through an inlet pipe 37.

The thermo-technological advantages of the apparatus according to the invention are as follows:

Apart from the initial period when the heating of a neutral gas (e.g. nitrogen) takes place, the heat quantity necessary for the pyrolysis process is provided by introducing heat into the pyrogas through the wall. Therefore, apart from the short initial period, there is no unnecessary inert gas heating, which results in energy saving.

Heat transfer through the wall (heat exchanger 20) is provided to the cleaned pyrogas of a quantity controlled by the regulator armature 18, and therefore its outlet temperature may be adjusted even with a 1-3° C. accuracy.

The gas to be burnt in the heat exchanger 20 may come from the pyrolysis process itself and therefore in the given case an external source of energy is to be utilised in the starting phase only.

The energy content of the flue gas leaving the heat exchanger 20 is utilised for the pre-heating of rubber shreds ready to be pyrolysed and located in the separate pre-heater 4. Again, the heat transfer is done by direct contact, which ensures a well regulated and uniform temperature control. The pre-heating also makes sure that the surface moisture is removed. The temperature of pre-heating is lower than the initial temperature of starting the pyrolysis.

The heat quantity stemming from the cooling of the carbon black serves for pre-heating the combustion air, which improves the cost efficiency of the whole technology.

Figure 2:
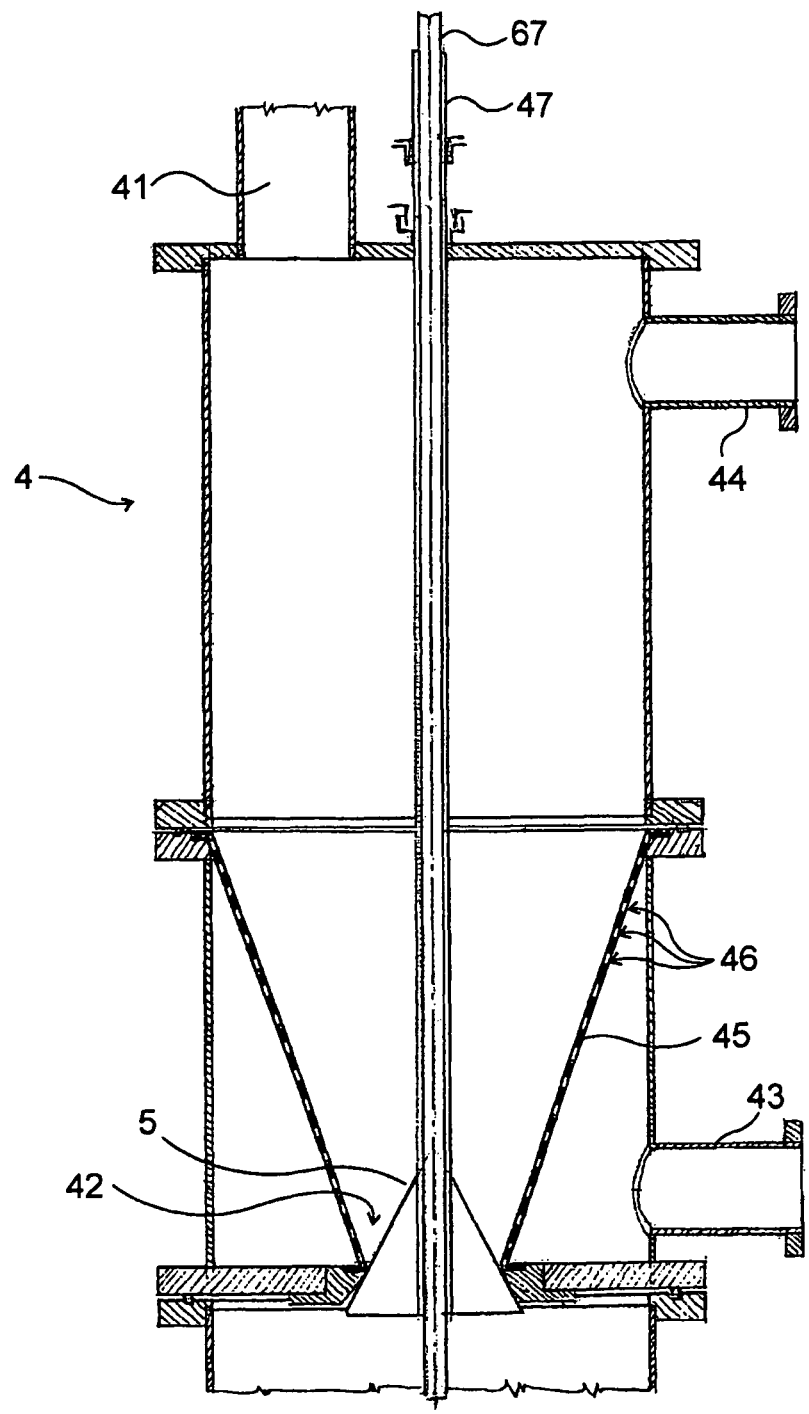
FIG. 2 is a cross section of a pre-heater used as an example for the apparatus in FIG. 1.

By way of example, FIG. 2 shows a schematic sectional view of the pre-heater 4 of the apparatus according to FIG. 1. The pre-heater 4, which serves for reducing the energy costs, comprises a feeding port 41, through which the waste to be pyrolysed is introduced into the processing circuit. The shut-off member 5 of the pre-heater is designed to shut off a discharge port 42; through this port, the pre-heated waste is fed into the reactor 6. Pre-heating is performed by a pre-heating medium, preferably flue gas, according to the discussion above, and the flue gas is driven through the pre-heater 4 via an inlet port 43 and an outlet port 44. A temperature of up to 150-180° C. is provided preferably at the pre-heater, so that pyrolysis is not yet started there. According to the invention, the roles of the inlet port 43 and the outlet port 44 can be exchanged.

In the lower part of the inventive pre-heater 4, a baffle means 45 made of a plate material is arranged to enable a gravitational slipping of the pre-heated waste towards the discharge port 42. The baffle means 45 has openings 46 which enable the flow of the pre-heating medium. The figure shows that the inlet port 43 is adjoined to the part below the baffle means 45, and the outlet port 44 is in connection with the part above the baffle means 45. The flow communication between the two ports is provided for by the openings 46. The waste gravitationally collected at the bottom of the pre-heater 4 is heated up uniformly by means of the openings 46. Through this design it can be achieved that for the forwarding of the pre-heated waste to the reactor 6, only the shut-off members 5 must be actuated, because the forwarding is done by gravitational sliding.

The baffle means 45 has preferably an upside-down truncated cone or truncated pyramid shape with the openings made by perforation. The slope of the baffle means 45 is preferably 45-80°, and the conic angle of the conically shaped shut-off member 5 is preferably 15-35°. Other slopes may also be selected, but these members are to be designed in a way that the solid residues (carbonised rubber residue) quickly and smoothly slip out of the unit by gravitation.

One of the work cylinders 13 operates the shut-off member 5 via a vertical actuating member 47, which is preferably a heat resistant steel actuating pipe, in which a heat resistant steel actuating bar is arranged for operating the shut-off member 7 of the reactor 6.

Figure 3:
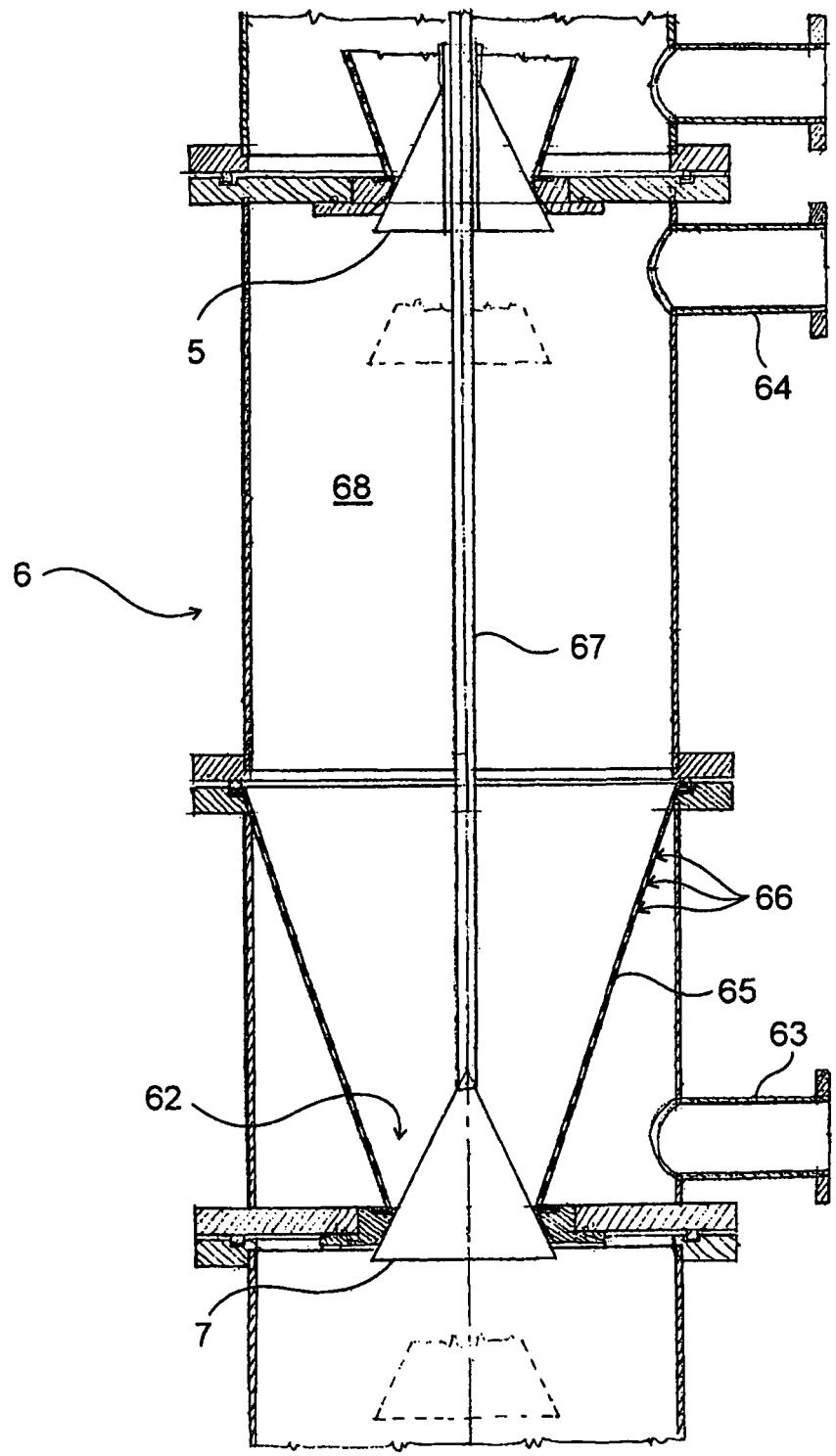
FIG. 3 is a cross section of a pyrolysis reactor of the apparatus in FIG. 1.

FIG. 3 shows a schematic sectional view of the pyrolysis reactor 6 used by way of example in the apparatus shown in FIG. 3. The opened positions of the shut-off members 5 and 7 are shown with a dotted line in the figure. From the reactor 6, the solid residues leave through a discharge port 62. The heating medium for transferring the heat necessary for pyrolysis is driven across a pyrolysis space 68 of the reactor 6, in a way similar to that shown in FIG. 2. An inlet port 63 and an outlet port 64 are connected to the reactor 6 in a way that one is in connection with the pyrolysis space 68 and the other with a lower space separated by a baffle means 65 below the pyrolysis space. Again, it is possible in this case to exchange the roles of the inlet port 63 and the outlet port 64, but in our experiments we found out that it was preferable to adjoin the inlet port 63 to the lower space.

Again, the baffle means 65 is made of a plate which enables the gravitational slipping of solid residues towards the discharge port 62. The baffle means 65 has openings 66 which enable the passing through of the heating medium. Again, the baffle means 65 is preferably an upside-down truncated cone or upside-down truncated pyramid, in which the openings 66 are made by perforation. The openings 46, 66 in both baffle means 45 and 65 are preferably of 3 to 10 mm diameter, smaller than the size of shredded rubber crumbs. The gradient of the baffle means 65 is preferably also between 45 to 80°, and the conic angle of the conically shaped shut-off member 7 is preferably between 15 to 30°.

According to the invention, the baffle means 45, 65 may not only be shaped in the form of a reversed pyramid or cone, but they may also be for example planar slanted plates sloping in one direction. Furthermore, any solution is conceivable which enables a gravitational forwarding of the material and is fitted with openings that enable the passing of the medium and provide a uniform heat transfer.

The operation of shut-off member 7 is provided according to the description above by the actuating member 67, preferably an actuating bar.

According to the invention, the rubber to be pyrolysed or other comminuted waste ready for pyrolysis is practically in a quiescent state during pyrolysis in the reactor 6 (the interrelated positions of the rubber shreds only change as a result of gravitation), i.e. there is no need for mechanical stirring. The heating medium, which can be for example nitrogen, air, any suitable inert gas or after the appearance of pyrogas, the pyrogas itself, slowly passes (in 0.1 to 0.5 m/s) through the gaps of the rubber waste and transfers the heat to it by direct contact. By this and also by means of the openings 66 in the baffle means 65, the simultaneous and uniform thermal distribution pyrolysis of a charge can be provided between 300 and 800° C. The uniform heating makes sure that the chemical reactions take place similarly simultaneously on each piece of the waste, i.e. a pyrogas of nearly identical chemical composition is generated everywhere.

Consequently, no air mixing is required in the reactor according to the invention and the relatively low temperature enables the use of lower cost structural materials. A further advantage of the reactor according to the invention is that heat input required for the endothermic reaction takes place in the heat exchanger 20 outside the reactor 6 and hence the heat input can be regulated much better than in the case when the reactor is directly heated.

Hence, according to the invention, the temperature of rubber waste is very uniform and it can be changed very uniformly in time, respectively. The temperature of each piece and that of the layers consisting of the pieces may be adjusted even with an accuracy of 1 to 5° C.

It is a further advantage that by a consistent regulation of a temperature difference between the layer temperature and the heating gas, the temperature changing in time on the rubber pieces may also be well-regulated, which makes sure that at the end of the pyrolysis process a product of a required chemical composition is obtained. The pyrolysis temperature may even be reduced, which offers not only thermal technology advantages, but also a benefit from the aspect of the technology, namely more aliphatic and less aromatic compounds are generated. Due to the uniform and accurate temperature regulation, the technological process can be regulated in a way that a higher volume of liquid state, more valuable product is generated with less gas and carbon black.

Figure 4:
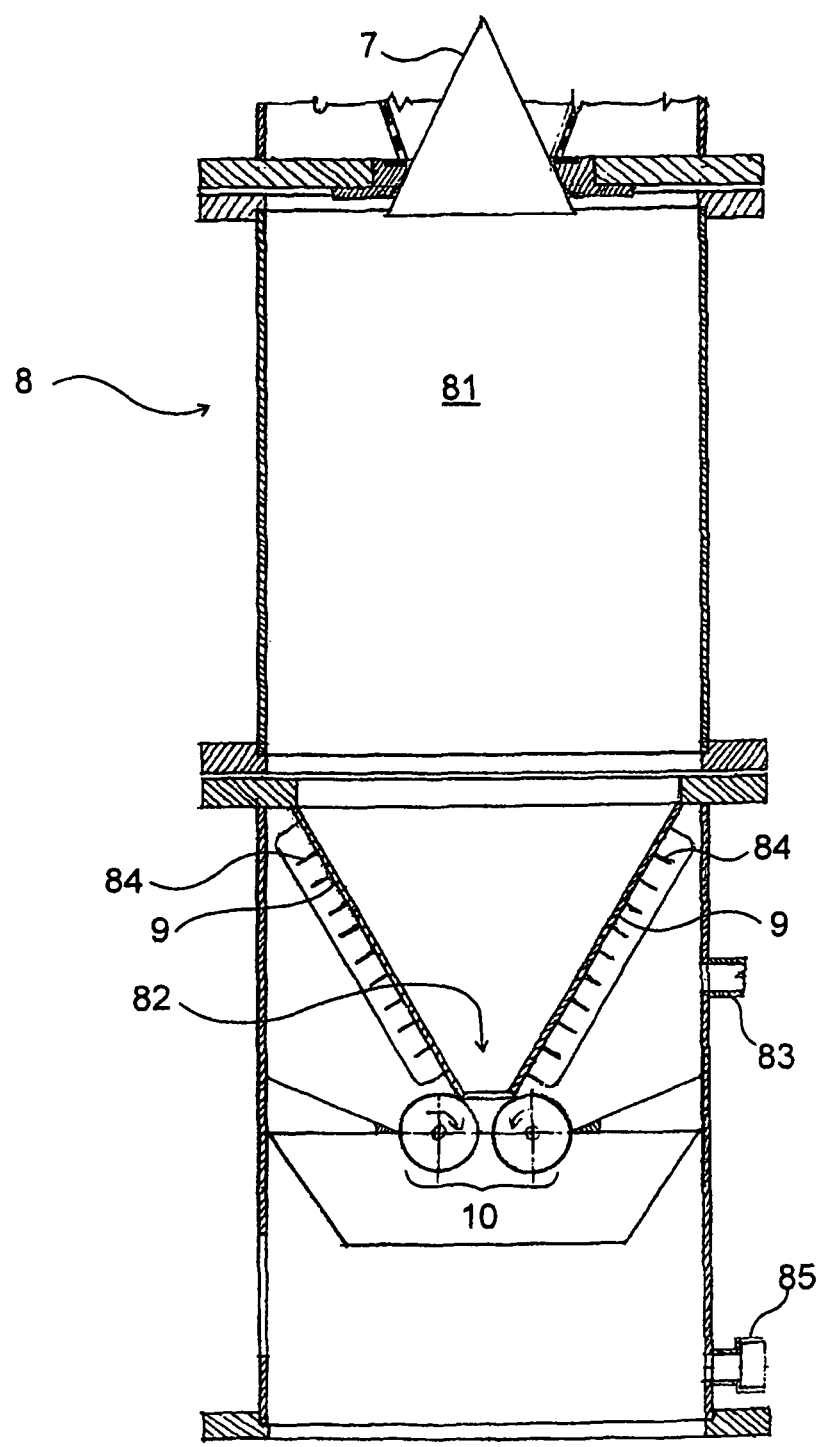
FIG. 4 is a cross section of a residue treatment unit of the apparatus in FIG. 1.

FIG. 4 shows a schematic sectional view of the residue treatment unit 8 according to FIG. 1. The solid residues of the pyrolysis are forwarded to a collecting space 81, and they leave the residue treatment unit 8 through a discharge port 82. In the lower part of the residue treatment unit 8 is the cooling baffle 9, which is also designed for gravitational feed, but without openings. The cooling baffle means 9 is preferably made of a plate, and on its bottom side there are cooling ribs 84 or other cooling members improving the efficiency of cooling. This enables commencing the cooling of the high temperature pyrolysis residue. The cooling medium can be air or liquid. The figure also shows a pipe stub 83 serving for adjoining to a vacuum system. The crushing cylinders 10 are arranged at the bottom of the residue treatment unit 8.

Figure 5:
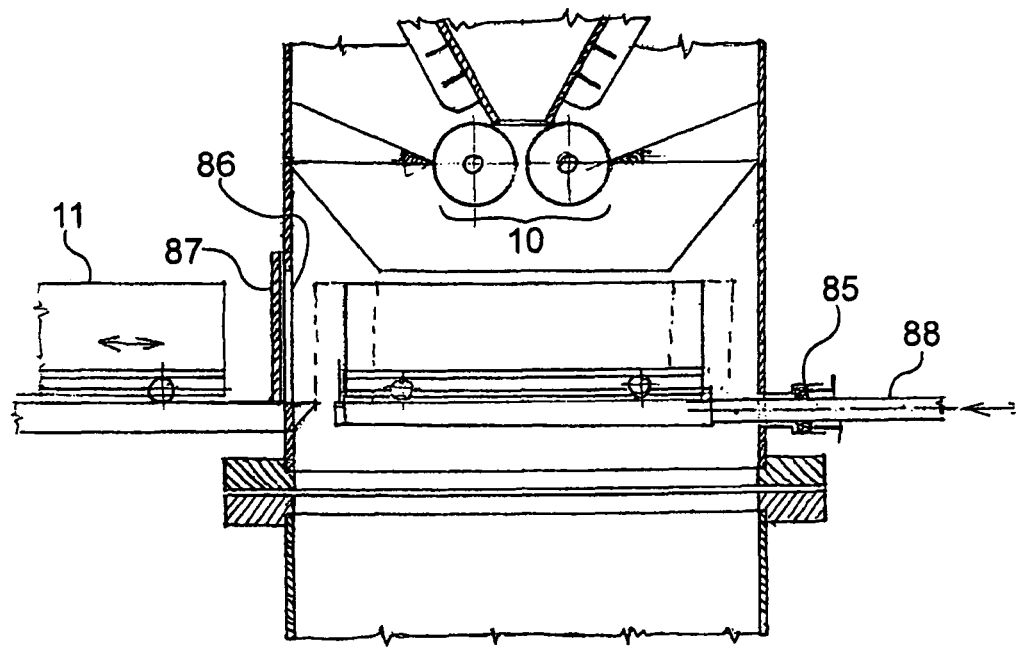
FIG. 5 is a schematic sectional view of the lower part of the residue treatment unit in FIG. 4.

As shown in FIG. 5, the shaking apparatus 22 shakes the trolleys 11 by means of a shaking bar 88 via a shaking opening 85, and as a result of the shaking, the carbon black drops through the sieve located at the bottom part of the trolley 11. The solid residue, preferably the steel wires from the scrap rubber tyre crumbs are collected after being captured in trolleys 11, and then they can be forwarded to the vessel 12 by means of the trolleys 11. Preferably, forwarding can be carried out through a door aperture 86 which can be closed by a door 87.

Figure 6:
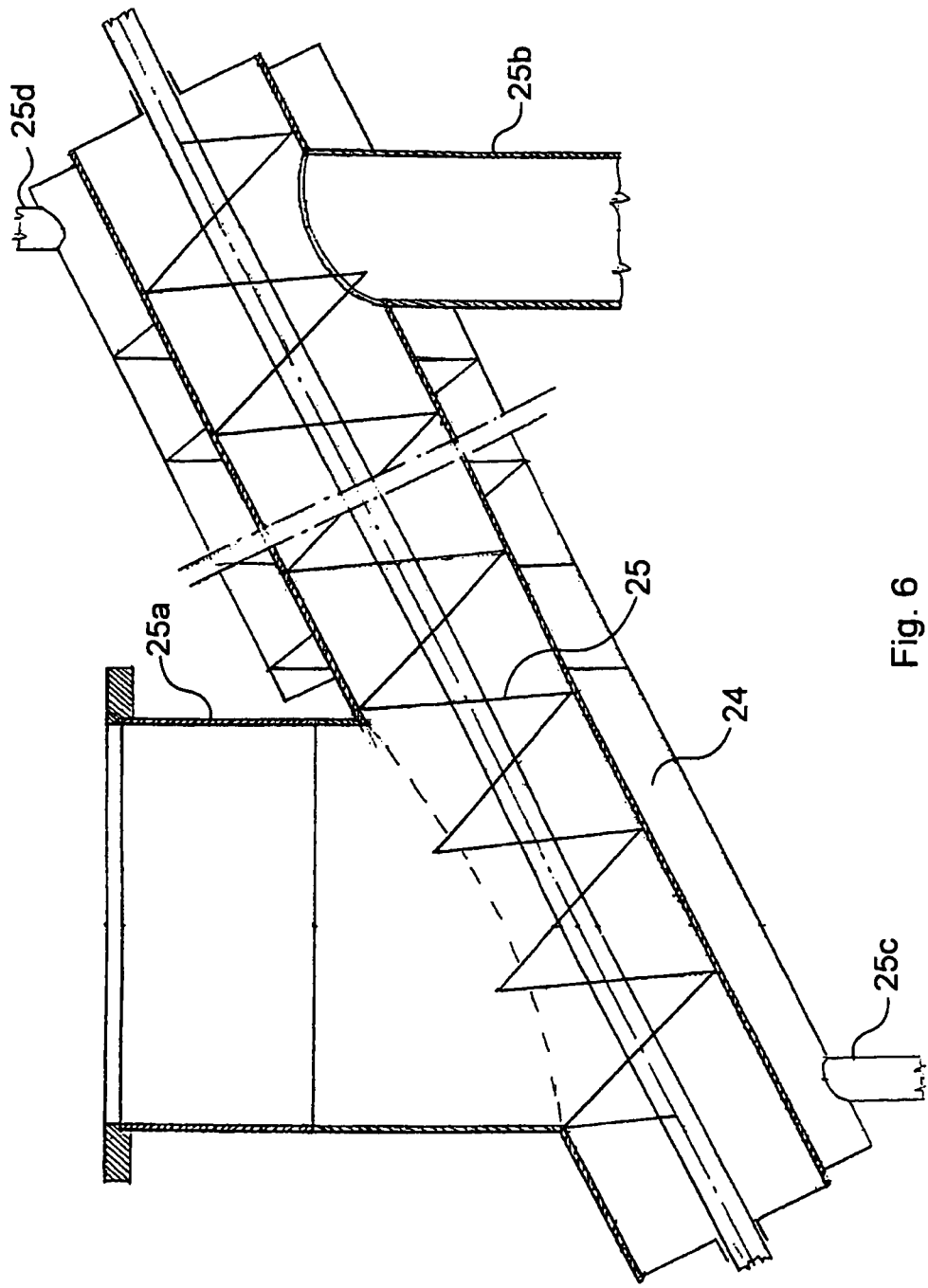
FIG. 6 is a schematic sectional view of the carbon black cooler transport unit as per FIG. 1.

FIG. 6 shows a sectional view which also depicts the cooling function of the transporting means 25. The carbon black falling through the sieves of the trolleys 11 is fed to the transporting means 25, preferably an auger, via a feeding port 25a. The carbon black carried upwards by the auger is cooled as a result of a cooling provided in the jacket 24 and the cooled carbon black is supplied to the carbon black vessel 28 through a discharge port 25b. The cooling is carried out by a cooling medium—preferably air—driven preferably in counter-current with the carbon black to be cooled through the jacket 24 by means of an inlet port 25d and an outlet port 25c. The roles of the two ports can be exchanged in this case, again.

The cooling auger system is preferably run by a motor of variable speed. This variable speed ensures the adjustment of the period during which the carbon powder stays in the unit so that the powder is cooled down.

In the apparatus according to the invention, the pre-cooling, the pyrolysis and the cooling of the carbon black/treatment of the residues are carried out in charges, i.e. the apparatus is run in a quasi-continuous operation mode. It is advisable to control the processes in a way that the time requirement of pre-heating, pyrolysis and carbon black cooling is nearly the same. The continuity is represented by an undisturbed sequence of these technological steps in time. Therefore, the thermal technology and chemical technology processes taking place on the charges can be kept well in hand and controlled either manually or by means of suitable electronics.

Figure 7:
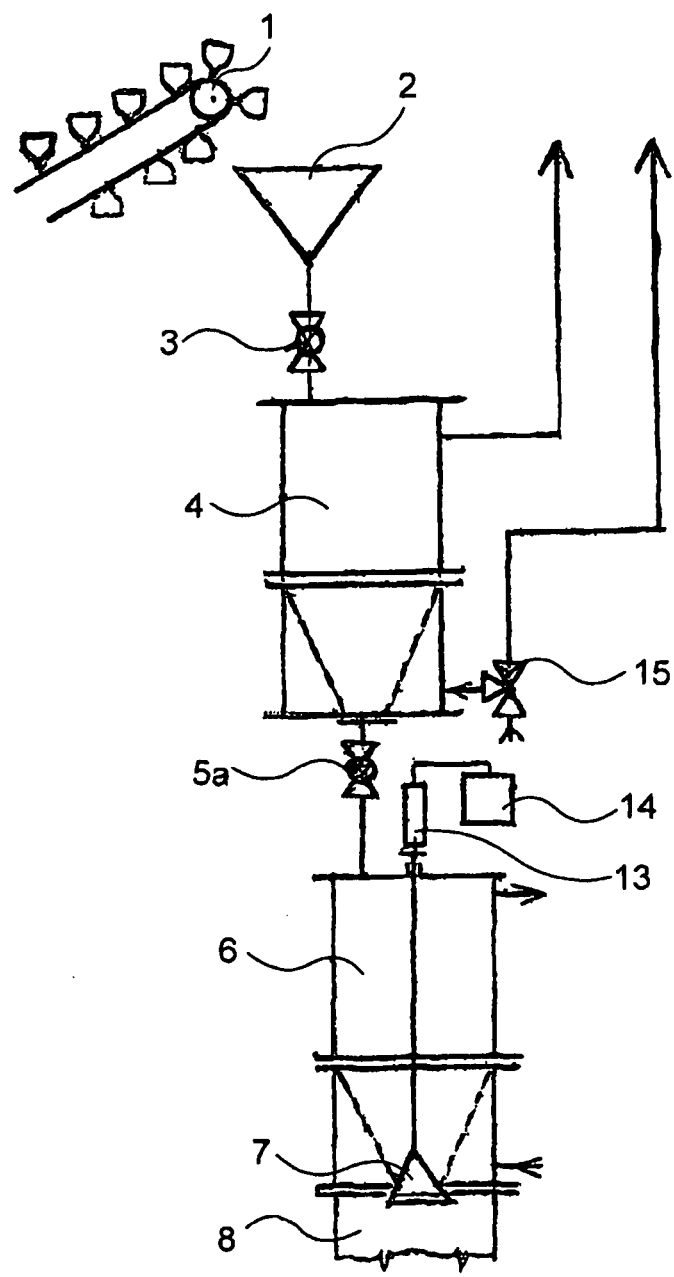
FIG. 7 is a schematic view of part of a further apparatus according to the invention.
Figure 8:
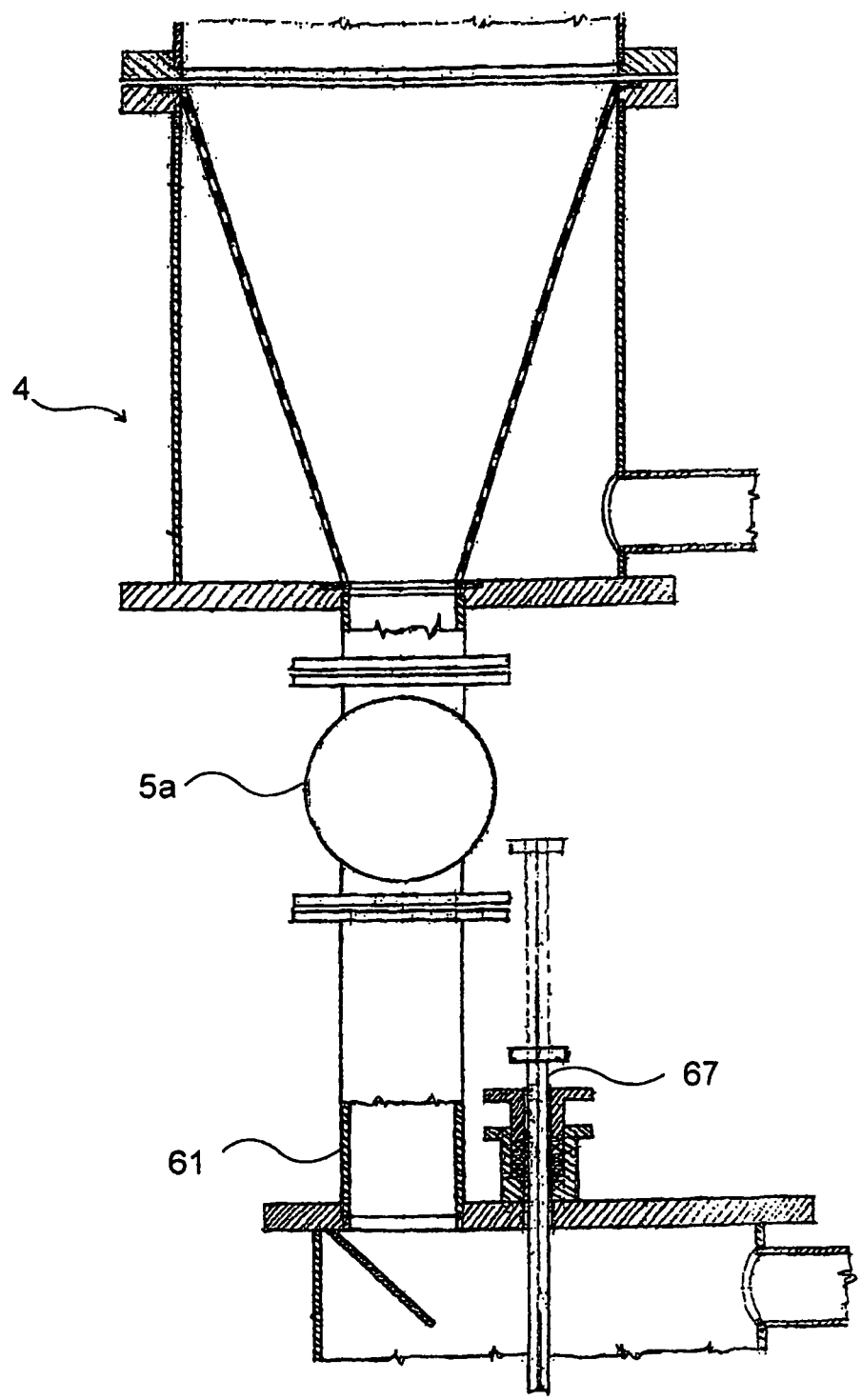
FIG. 8 is a view partly in cross section of a fitting component between the pre-heater and the reactor in the apparatus shown in FIG. 7.

The alternative embodiment shown in FIG. 7 is different from the apparatus shown in FIG. 1 in that the pre-heater 4 does not have a conic shut-off member, but a shut-off member designed as a shut-off armature 5a, preferably a ball valve or butterfly valve. In this case it is not necessary to apply an actuating tube/actuating bar set for operating the shut-off members, and a shorter actuating bar suffices, which makes the design somewhat more simple. In FIG. 8, a more detailed structural drawing of this design is shown partly in cross section. The figure shows the sealed transfer of the actuating bar 67 and furthermore also a baffle plate arranged below the feeding port 61 of the reactor 6, which baffle plate ensures—even in case the feeding port 61 is located transversally—the uniform spreading of the waste to be pyrolysed.

The invention is not limited to the preferred embodiments shown as an example in the figures, but other alternatives and modifications are also possible within the scope of the claims. The pre-heater, reactor and residue treatment unit shown in the figures are of a cylindrical design, but other shapes are also possible. In the baffle means according to the invention, the openings may also be designed in different ways, for example in different shapes and slot arrangements. According to the description above, the baffle means may not only be of a conic or pyramid design, but also any other solution that allows the gravitational feed of the materials can be applied.

The invention claimed is:

1. An apparatus for pyrolysing waste, in particular rubber tyres, said apparatus comprising a reactor, wherein the reactor comprises a pyrolysis space, an inlet port and an outlet port enabling a flow across the pyrolysis space of a heating medium for transferring heat required for the pyrolysis, a lower discharge port for discharging solid residues of the pyrolysis, a baffle means made of a plate material and enabling a gravitational slipping of the solid residues towards the discharge port, the baffle means having openings allowing the flow of the heating medium and being arranged to divide the inner space of the reactor to form an upper pyrolysis space above the baffle means and a lower space below the baffle means, wherein one of the inlet and outlet ports is in connection with the pyrolysis space and the other one with the lower space, a conical shaped shut-off member defined by a conical angle, the shut-off member fitting into the discharge port, and an actuated, vertical actuating member, which is connected to the shut-off member, and wherein the baffle means is one of an upside-down truncated cone or an upside-down truncated pyramid shape having a slope between 45 and 80°, means for driving through the reactor a flow of a heating medium for transferring heat necessary for the pyrolysis, and means for discharging the solid residues of the pyrolysis, and a pre-heater arranged above the reactor, said pre-heater comprising a baffle means, a shut-off member, an inlet port and an outlet port for a pre-heater medium wherein the shut-off member of the pre-heater is operated by an actuating tube, and the shut-off member of the reactor is operated by an actuating bar fitted into the actuating tube, wherein the means for discharging the solid residues of the pyrolysis comprises a discharge port of a residue treatment unit.

2. The apparatus for pyrolysing waste according to claim 1, wherein the actuated, vertical actuating member of the reactor is one of an actuating bar or an actuating tube.

3. The apparatus for pyrolysing waste according to claim 1, wherein the conic angle of the conically shaped shut-off member of the reactor is between 15 and 30°.

4. The apparatus for pyrolysing waste according to claim 1 wherein the inlet port of the reactor is connected to the lower space of the reactor.

5. The apparatus for pyrolysing waste according to claim 4, wherein the openings in the baffle means are of 3 to 10 mm diameter.

6. The apparatus according to claim 1, wherein the shut-off member of the pre-heater is a shut-off armature.

7. The apparatus according to claim 1, further comprising a residue treatment unit positioned below the reactor, the residue treatment unit comprising a collecting space, a lower discharge port, and a cooling baffle means made of a plate material and enabling a gravitational slipping of the solid residues towards the discharge port, said cooling baffle means being provided with cooling on its bottom face.

8. The apparatus according to claim 7, further comprising cooled crushing cylinders arranged below the lower discharge port of the residue treatment unit, below which a space is located.

9. The apparatus according to claim 6, wherein the shut-off member of the pre-heater is one of a ball valve, a butterfly valve and a plate lock.

10. The apparatus according to claim 8, wherein transportation units are selectively housed in the space.

11. The apparatus according to claim 8, further comprising at least one trolley, wherein the at least one trolley is selectively housed in the space, wherein the at least one trolley is configured for shaking with a shaking apparatus and wherein the at least one trolley has a sieve bottom.

* * * * *